(12) United States Patent
Zavdi et al.

(10) Patent No.: US 10,581,916 B2
(45) Date of Patent: Mar. 3, 2020

(54) SYSTEM AND METHOD FOR IDENTIFYING CYBER-ATTACKS

(71) Applicant: NUCLEON LTD., Beerot Itzhak (IL)

(72) Inventors: Moran Zavdi, Ramat Gan (IL); Yossi Accav, Binyamina (IL)

(73) Assignee: NUCLEON LTD, Beerot Itzhak (IL)

( * ) Notice: Subject to any disclaimer, the term of this patent is extended or adjusted under 35 U.S.C. 154(b) by 98 days.

(21) Appl. No.: 15/653,625

(22) Filed: Jul. 19, 2017

(65) Prior Publication Data

US 2018/0027015 A1    Jan. 25, 2018

Related U.S. Application Data

(60) Provisional application No. 62/363,853, filed on Jul. 19, 2016.

(51) Int. Cl.
*H04L 29/06* (2006.01)

(52) U.S. Cl.
CPC ...... *H04L 63/1491* (2013.01); *H04L 63/1416* (2013.01); *H04L 63/1441* (2013.01); *H04L 63/1408* (2013.01); *H04L 63/1433* (2013.01)

(58) Field of Classification Search
CPC ............. H04L 63/1491; H04L 63/1416; H04L 63/1441; H04L 63/1408; H04L 63/1433
See application file for complete search history.

(56) References Cited

U.S. PATENT DOCUMENTS

| | | | |
|---|---|---|---|
| 2017/0093910 A1* | 3/2017 | Gukal | H04L 63/1416 |
| 2017/0207990 A1* | 7/2017 | Curtin | H04L 43/028 |

* cited by examiner

*Primary Examiner* — Paul E Callahan
(74) *Attorney, Agent, or Firm* — Browdy and Neimark, P.L.L.C.

(57) ABSTRACT

A polymorphic sensor may be adapted to repeatedly, continuously and/or autonomously: receive a resource selection from a server and imitate the selected resource; detect an attack on the imitated resource; identify the attack and send, to the server, information characterizing the attack; and terminate the imitation of the resource upon receiving a command from the server.

20 Claims, 4 Drawing Sheets

SYSTEM AND METHOD FOR IDENTIFYING CYBER-ATTACKS

CROSS REFERENCE TO RELATED APPLICATIONS

This application claims the benefit of U.S. Ser. No. 62/363,853, filed on Jul. 19, 2016 and entitled SYSTEM AND METHOD FOR IDENTIFYING CYBER-ATTACKS, which is incorporated in its entirety herein by reference.

FIELD OF THE INVENTION

The present invention relates generally to identifying cyber-threats and cyber-attacks. More specifically, the present invention relates to identifying and/or characterizing a cyber-attack using an imitated or faked resource.

BACKGROUND OF THE INVENTION

Cyber-attacks and cyber-threats are known in the art and generally include, or are related to, various offensive systems, methods and operations that target information and infrastructure. Cyber-attacks and cyber-threats typically include stealing sensitive information, deleting or modifying information in an attacked system, disabling or otherwise interfering with an operation of a computing system, etc. Typically, the source of an attack (or identity of an attacker) is unknown.

Various systems and methods for combating cyber-attacks and cyber-threats are known. For example, anti-virus software, firewalls and the like are employed in order to protect systems against cyber-attacks and/or cyber-threats.

SUMMARY OF THE INVENTION

In some embodiments, a polymorphic sensor (PS) may be adapted to repeatedly, continuously and/or autonomously receive a resource selection from a server and imitate the selected resource; detect an attack on the imitated resource; identify the attack and send, to the server, information characterizing the attack; and terminate the imitation of the resource upon receiving a command from the server.

Information sent to a server may include for example data related to a session established between an attacker and an imitated resource. Identifying an attack may be based on an interaction of an attacker with an imitated resource. An imitated resource may be for example a network and imitating the resource may include for example imitating at least one of a device, a server, a computerized service, a network protocol and an application in the network.

A server may select a resource to be imitated based on a set of rules; instruct a polymorphic sensor to imitate the selected resource; and instruct a PS to terminate an imitation of the resource. A server may be adapted to categorize an attack and include a categorization of the attack in a report that may be stored and/or presented to a user. A server may be adapted to identify an attack based on session data related to a session established between an attacker and an imitated resource.

A server may be adapted to categorize an attack and include a categorization of the attack in a report presented to a user. Categorizing an attack may include for example identifying an application used by an attacker, identifying a method used for the attack and identifying a bot participating in the attack. A server may be adapted to select a resource for imitation based on a set of rules, and based on at least one PS configuration.

A PS may be adapted to autonomously terminate, and report to a server a termination of, an imitation of a resource based on at least one predetermined parameter. A predefined parameter may be one of for example: a time period for imitating a resource, a number of interactions with an imitated resource and an identity of an attacker interacting with the resource. A PS may be adapted to, based on a command received from a server, do one of: autonomously terminate the imitation of the resource and terminate the imitation of the resource in response to a message from the server.

A PS may be adapted to imitate a resource according to predefined rules and report to a server upon terminating the imitation of the resource. A PS may be adapted to determine communication with the server is unavailable; record data related to the attack; modify a network configuration of at least one network interface of the polymorphic sensor; and attempt to communicate with the server using the network interface. A PS may be adapted to determine that communication with a server is unavailable and, store data related to an attack on a predefined storage system.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
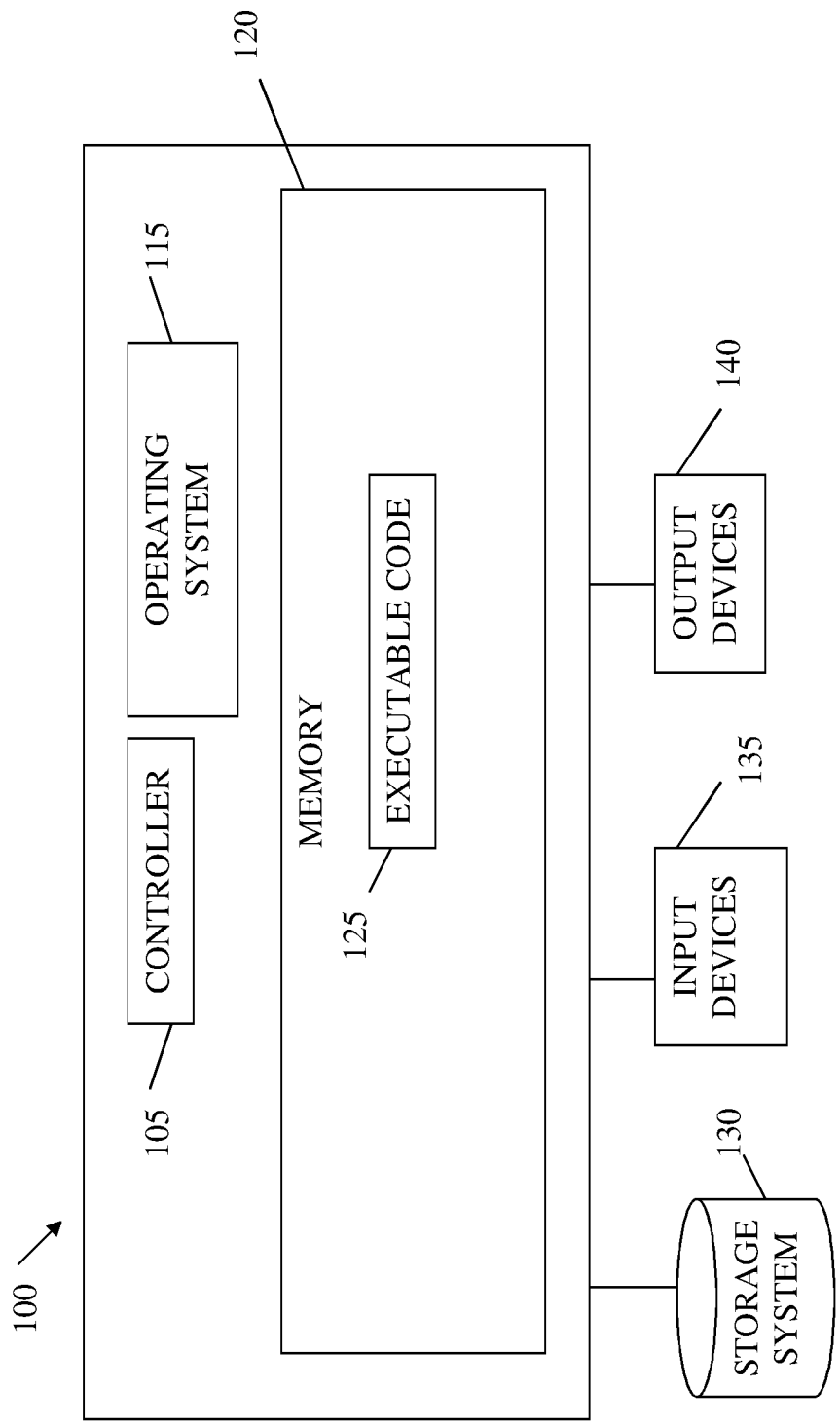
FIG. 1 shows high level block diagram of an exemplary computing device according to illustrative embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

A system and method according to some embodiments of the invention may identify attacks and/or attackers by selecting a resource to be imitated or faked, and identifying, or characterizing, an attack or an attacker based on information obtained when an attacker interacts with the imitated or faked resource.

A system according to embodiments of the invention may include one or more computing devices, e.g., computing devices similar to computing device 100 described herein. Methods according to embodiments of the invention may be carried out by one or more computing devices, e.g., computing devices similar to computing device 100 described herein.

Figure 2:
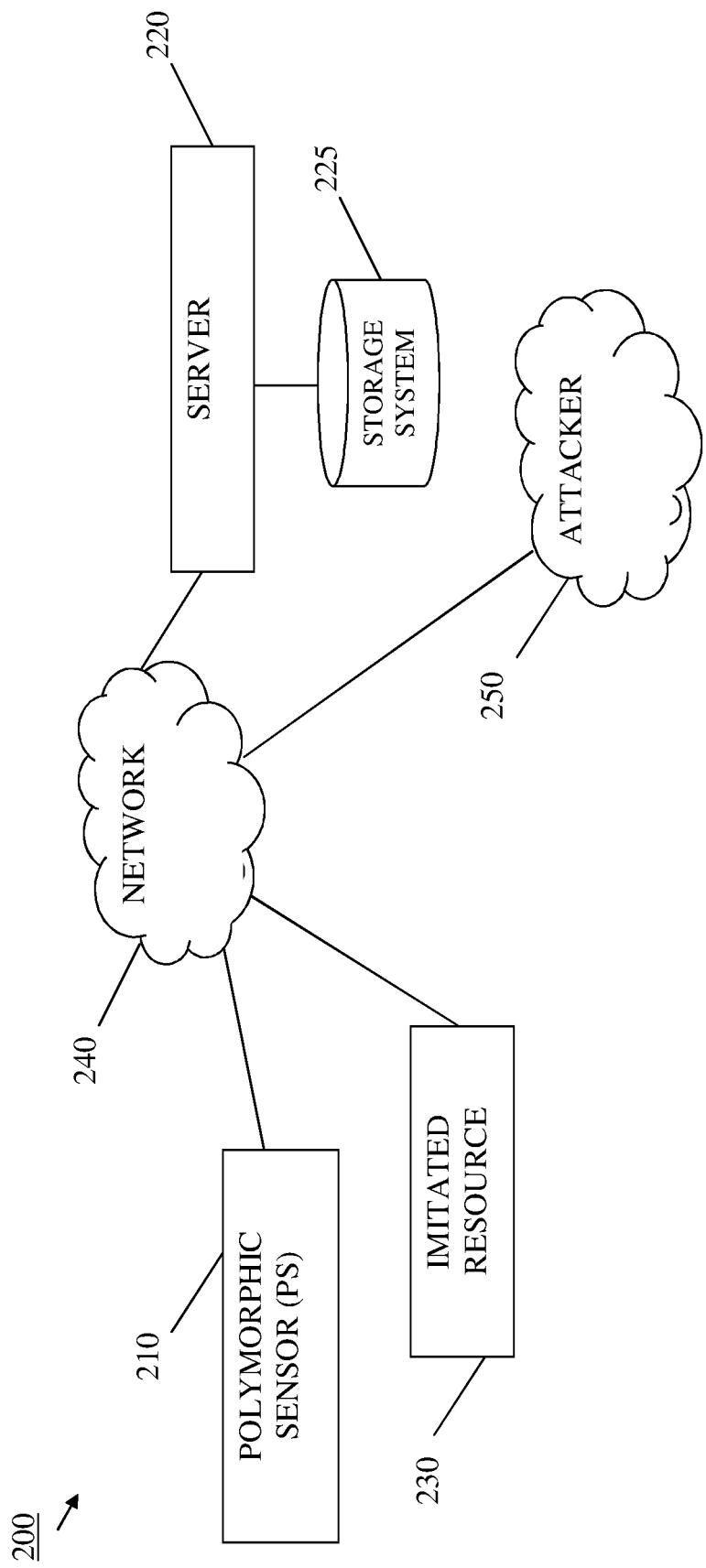
FIG. 2 is an overview of a system according to illustrative embodiments of the present invention.

Reference is made to FIG. 1, showing a high level block diagram of an exemplary computing device according to some embodiments of the present invention. Computing device 100 may include a controller 105 that may be, for example, a central processing unit processor (CPU), a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various modules, units, etc. More than one computing device 100 may be included, and one or more computing devices 100 may act as the various components, for example more than one polymorphic sensors (PS) 210 and/or one imitated resource 230 as shown in FIG. 2 may be included in a system according to the invention.

For example, PS 210 and/or imitated resource 230 described herein may be, or may include components of, a computing device 100. For example, by executing executable code 125 stored in memory 120, controller 105 (e.g., included in PS 210 and/or imitated resource 230 described herein) may be configured to carry out a method of identifying and/or characterizing an attack as described herein. For example, as further described herein (e.g., with respect to PS 210 and/or imitated resource 230 that may each include a controller 105), controller 105 may be configured to receive a resource selection from a server and imitate the selected resource, detect an attack on the imitated resource, identify the attack and send, to a server, information characterizing the attack. Controller 105 may be configured to terminate the imitation of a resource upon receiving a command from the server or autonomously as described.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that identifies and/or characterizes an attack on an imitated resource. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein (e.g., PS 210) may be, or may include, controller 105, memory 120 and executable code 125.

Storage system 130 may be or may include, for example, a hard disk drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

As described herein, a system and method according to some embodiments of the invention may identify attacks and/or attackers by selecting a resource to be imitated or faked, and identifying, or characterizing, an attack or an attacker based on information obtained when (or after) an attacker interacts with the imitated or faked resource. As described herein, a system and method according to some embodiments of the invention may use a faked, emulated or imitated service, resource or assets as bait in order to lure an attacker to launch an attack on the faked or imitated resource. When an attack on a faked or imitated resource is detected, or when an embodiment determines an attack on a faked or imitated resource is in progress as described, information related to the attack and/or attacker may be collected or obtained by a faked resource and/or by a unit that controls the faked resource. Information and data related to an attack and/or attacker may be used (e.g., by a server) in order to identify and/or characterize the attack and/or attacker.

Generally, as referred to herein, a real service, a real resource and/or a real asset relate to a service, resource and/or asset as known in the art. For example, a real service, resource or asset may be a server computer or other hardware device, or it may be a service provided by a server. For example, a real resource, service or asset may be a database system that can actually store data and provide stored data or it may be a Domain Name System (DNS) server or service that can actually translate domain names to internet protocol (IP) addresses.

In contrast, as referred to herein, faked, emulated or imitated services, resources and assets are not real assets that can be readily used by users or applications. In some embodiments, faking, emulating or imitating resource, services and/or assets may include any operations or aspects that can cause an attacker to think or calculate (think in the sense that a computer attacker may think) that a faked or imitated resource is a real resource. For example, in order to imitate, fake or emulate a DNS server, units such as polymorphic sensor 210 or imitated resource 230 (shown in FIG. 2 and further described herein) may broadcast DNS packets on a network even though these units cannot or may not be able to actually translate domain names to IP addresses. In some embodiments, faking, emulating or imitating resource, services and/or assets may include advertising services without actually providing (or being able to provide) the advertised services. For example, in order to imitate a resource or asset, polymorphic sensor 210 or imitated resource 230 may advertise data storage services even though they cannot or do not intend to provide the advertised services.

The term "polymorphic sensor" may relate to a versatile sensor or detector that may sense, detect, characterize or identify attacks by providing a number of different forms or types of sensors and/or performing different functions or activities that create different types or forms of sensors or detectors. For example, a polymorphic sensor (e.g., PS 210) may imitate a number of different resources that may be of different forms or types. Such a sensor may be for example a computer system such as shown in FIG. 1, a software module executed on a computer system, or a dedicated circuit or hardware device.

The term "real-time" (also known in the art as "realtime", or "real time") as referred to herein generally relates to processing or handling of events at the rate or pace that the events occur or received. For example, a system according to embodiments of the invention may detect an attack on an imitated resource in real-time, e.g., an attack and/or an attacker may be identified upon, or within milliseconds or other very brief periods after, an attack on an imitated resource starts or detected.

Reference is made to FIG. 2, an overview of a system 200 according to some embodiments of the present invention. As shown, system 200 may include a PS 210, a server 220 operatively connected to a storage system 225, an imitated (or faked) resource 230, a network 240 and an attacker 250.

Network 240 may enable PS 210, server 220 storage system 225, imitated resource 230, and attacker 250 to communicate, for example, network 240 may be, or may be included in, the Internet. In some embodiments, network 240 may be, may include, or may be part of, a private or public IP network, or the internet, or a combination thereof. Additionally or alternatively, network 240 may be, may include, or be part of, a global system for mobile communications (GSM) network. For example, network 240 may include an IP network such as the internet, a GSM related network and any equipment for bridging or otherwise connecting such networks as known in the art. In addition, network 240 may be, may include or be part of an integrated services digital network (ISDN), a public switched telephone network (PSTN), a public or private data network, a local area network (LAN), a metropolitan area network (MAN), a wide area network (WAN), a wireline or wireless network, a local, regional, or global communication network, a satellite communication network, a cellular communication network, any combination of the preceding and/or any other suitable communication means. Accordingly, numerous elements of network 240 are implied but not shown, e.g., access points, base stations, communication satellites, GPS satellites, routers, telephone switches, etc. It will be recognized that embodiments of the invention are not limited by the nature of network 240.

PS 210 may be any suitable unit, module or device. For example, PS 210 may be, or may include components of, computing device 100, e.g., a controller 105, executable code 125 and a memory 120. For example, when executed by a controller 105 included in PS 210, executable code 125 may cause controller 105 to repeatedly, iteratively, continuously and/or autonomously: receive a resource selection from server 220 and imitate the selected resource. When executed by a controller 105 included in PS 210, executable code 125 may cause controller 105 to detect or identify an attack on an imitated resource, identify the attack and send, to server 220, information characterizing the attack. When executed by a controller 105 included in PS 210, executable code 125 may cause controller 105 to terminate an imitation of a resource, e.g., upon receiving a command from the server or autonomously, e.g., according to a time value received from server 220.

Although a single PS 210 and a single server 220 are shown in FIG. 2, other embodiments and configurations may be contemplated. For example, a system according to some embodiments may include any number of PS 210 units similar to PS 210 and one or more servers similar to server 220 may communicate and collaborate with a plurality of PS 210 units. In some embodiments, a plurality of PS 210 units may be included in a single device. In some embodiments, one or more PS 210 units may be included in server 220. It will therefore be understood that the scope of the invention is note limited by the number or type of PS 210 units and/or number of servers 220 included in a system as described herein.

Attacker 250 may be any suitable computing device or unit, for example including components such as shown in FIG. 1. For example, attacker 250 may be a home or other computer operated by a hacker or attacker. In some cases, attacker 250 may be a botnet as known in the art. For example, attacker 250 may attempt (or be lured) to launch a denial-of-service (DOS) or a distributed DOS (DDoS) attack on imitated resource 230.

Imitated resource 230 may be any imitated resource that may be attacked, for example, imitated resource 230 may be an imitated service or server, e.g., an imitated Domain Name System (DNS) server or service, an imitated Lightweight Directory Access Protocol (LDAP) server or service etc.

In some embodiments, imitated resource 230 and PS 210 may be combined into a single unit, module, device or system, e.g., a single hardware unit, system or device. For example, the same executable code 125 may be or may include PS 210 and imitated resource 230, e.g., PS 210 and imitated resource 230 may be included, provided or executed by a single application or program. In other cases, imitated resource 230 may be remote form PS 210 and PS 210 may cause imitated resource 230 to fake or imitate a resource by providing imitated resource 230 with parameters such as a resource selection, an IP address, ports to use and the like. For example, PS 210 may pass on to imitated resource 230 any command or data it receives from server 220 as described herein.

In some embodiments, imitated resource 230 may be an imitation of a website (or an imitation of a server supporting a website as known in the art). Generally, imitated resource 230 may be an imitation of any resource, machine, service or application that may be attacked by an attacker 250. Although a single imitated resource 230 is shown in FIG. 2, it will be understood that a system and method according to the invention may include, be connected to, or work with, any number of imitated resources similar to imitated resource 230.

For example, any number of imitated resources similar to imitated resource 230 may be connected to network 240 and a system (e.g., one or more PS 210 units and servers 220) may detect or identify an attack on (or attackers of) any number of imitated resources on network 240, either simultaneously (e.g., simultaneously identify two or more attacks and attackers) or sequentially.

A method of identifying attacks (or determining an attack is in progress) according to embodiments of the invention may be carried out or performed continuously. In one embodiment, e.g., PS 210 may continuously, repeatedly and/or iteratively identify attack as described by iteratively imitating a resource and detect attacks on or directed to the imitated resource. For example, PS 210 may continuously, repeatedly and/or iteratively imitate the same resource with different parameters, e.g., PS 210 may continuously, repeatedly and/or iteratively imitate a DNS server using different IP addresses or PS 210 may continuously, repeatedly and/or iteratively imitate different resources, e.g., imitate a DNS server, then imitate an LDAP service and so on.

Server 220 may be a server or computer as known in the art. In some embodiments, server 220 may be, or may include components of, computing device 100, e.g., a controller 105, executable code 125 and a memory 120. For example, when executed by a controller 105 included in server 220, executable code 125 may cause controller 105 to select a resource to be imitated based on a set of rules, instruct (e.g., via network 240) the PS 210 to imitate the selected resource, and instruct PS 210 to terminate an imitation of the resource. When executed by a controller 105 included in server 220, executable code 125 may cause controller 105 to use data related to an attack, received from PS 210 and/or imitated resource 230 in order to identify and/or categorize an attack and/or an attacker, and include a categorization of the attack in a report presented to a user.

Server 220 may present any information to a user. For example, an identification of an attack and/or attacker may be presented, on a monitor connected to server 220, as numeric data, textual data and/or graphical data. For example, information identifying or characterizing an attack or attacker that may be presented and stored by server 220 may include an IP address and/or a name of a computer used to attack imitated resource 230, a time and date of the attack, a protocol used, a type of attack, and/or a specific method used to attack imitated resource 230. Other information characterizing or describing an attack or attacker may be used. For example, an attack may be identified and/or characterized as a DoS attack if the attacker is using known methods in an attempt to create or cause DoS of a service or computer, or an attack may be identified and/or characterized as DDoS based on the amount of the sources attacking a server at a short period of time. Another example, or method of, attack identification may be identifying the protocol used for the attack and/or the amount of data and speed used for the attack. For example, if an interactive protocol such as telnet is used to perform many requests at a short period of time it may indicate that (possibly an automated) machine is sending the requests, and so on. Since many types and methods of attacks are known in the art, including knowledge of the way they are performed, protocol and methods they use and so on, by comparing various aspects and/or attributes of an attack (e.g., timing aspects such as rate of requests, number of sources and protocols used and so on) to aspects and attributes of attacks stored in a database (e.g., stored on storage system 130), an embodiment may readily, easily and quickly identify an attack or determine an attack is in progress.

Storage system 225 may be any suitable storage system as known in the art. For example, storage system 225 may be an array of disks, a network storage system and the like. Storage system 225 may be, or may include any components of, storage system 130. Storage system 225 may include, or be used for storing, information related to attacks, attackers and resources to be selected for imitation as described.

Data stored in storage system 225 may include information related to an imitated resource. For example, operational values (e.g., a response time) of an imitated resource may be stored in storage system 225 and, when server 220 may instruct PS 210 to imitate a resource as described herein, server 220 may also provide PS 210 with operational values to be used when imitating the resource. For example, server 220 may instruct PS 210 what protocols and ports PS 210 is to use, server 220 provide PS 210 with data that is needed to run a specific protocol and so on. For example, if server 220 instructs PS 210 to imitate a mail server then server 220 may instruct PS 210 to open, and listen to, port 25, use simple mail transfer protocol (smtp) to thus identify or advertise itself, to a network, as an smtp server. Server 220 may send or provide PS 210 with information related to other PS 210 units on a network, e.g., in order to avoid a situation wherein a first PS 210 interacts with a second PS 210.

Figure 3:
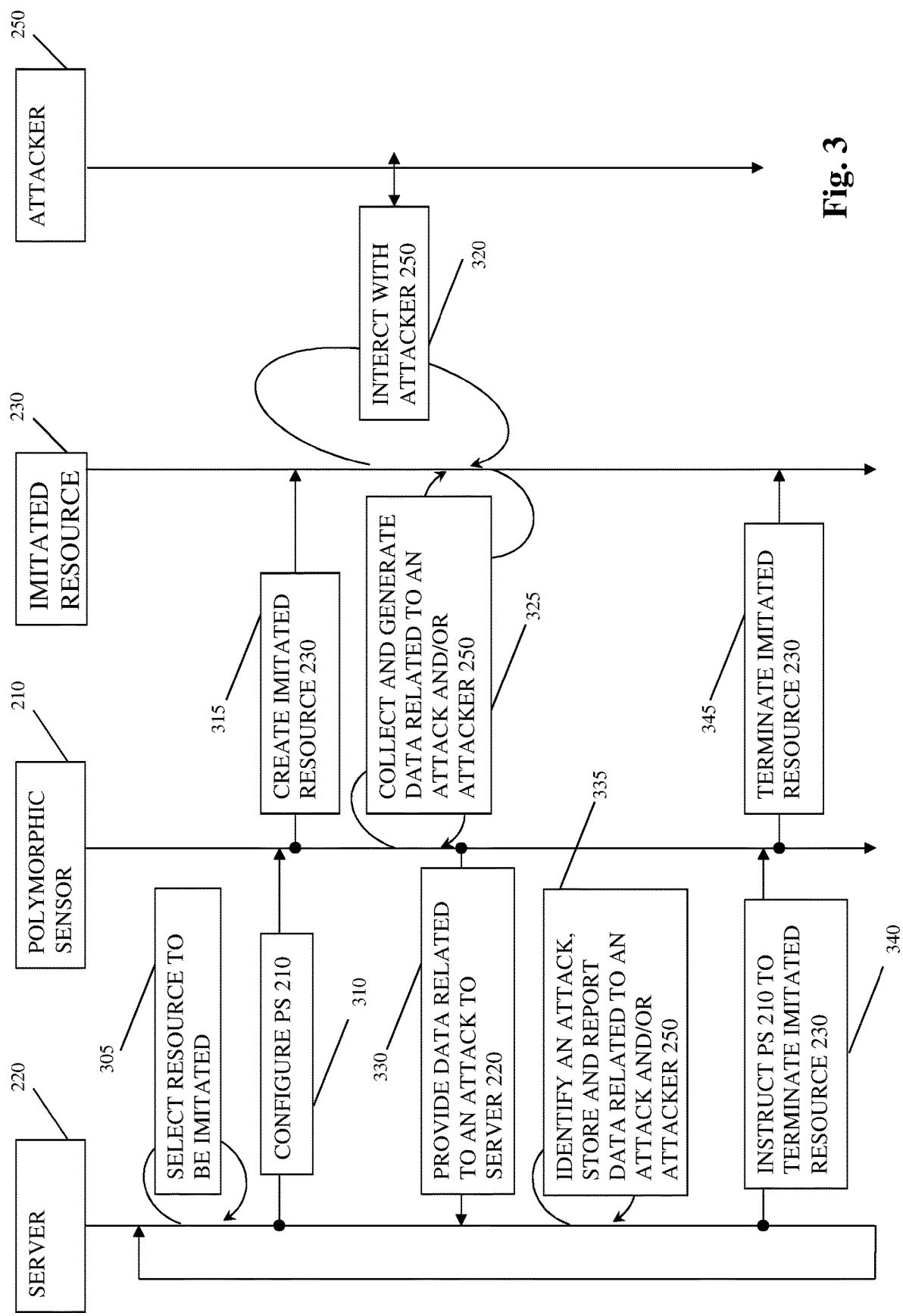
FIG. 3 shows a timeline according to illustrative embodiments of the present invention.

Reference is made to FIG. 3, a timeline of a method according to illustrative embodiments of the present invention. As shown by block 305, server 220 may select a resource to be imitated. In some embodiments, server 220 may select a resource to be imitated based on a set of rules. According to some embodiments of the invention, selecting, by server 220, a resource to be imitated, may be based on various considerations and logic.

For example, if it is known that a specific attacker typically attacks DNS servers then, in order to obtain data related to that specific attacker, server 220 may select a DNS service or server as the resource to be imitated and cause PS 210 to imitate a DNS service or server as described herein. Selecting services or resource to be imitated by one or more PS 210 units may be based on a calculation of the amount of the available PS 210 units in a network. For example, load balancing techniques may be used in order to balance or distribute the load of imitating resources on a network between a set of PS 210 units. Selecting services or resource to be imitated by one or more PS 210 units may be based on the type of network in which the PS 210 units are deployed. For example, a network may be an industry segment or network (such as finance, healthcare, critical infrastructure etc.) and the services or resources imitated by a PS 210 unit may be selected based on the network type, for example, deployed in a financial orientated network, a PS 210 may imitate services typically provided by banking servers or applications. For example, server 220 may include (e.g., in an attached database) knowledge and information related to networks, e.g., their types, services they include and the like, and may configure PS 210 units deployed in the networks based on such data or knowledge.

For example, storage system 225 may include definitions of, or for, a plurality of resource types and their attributes, and server 220 may select, from storage system 225, one of the resources as shown by block 305.

In some embodiments, server 220 may select a resource to be imitated based on one or more configurations of PS 210. For example, server 220 may select a resource to be faked, by PS 210, based on the geographical location of PS 210, a network PS 210 is connected to and/or other configurations or aspects related to PS 210.

As shown by block 310, server 220 may configure PS 210 according to a selected resource. For example, server 220 may instruct PS 210 to imitate the selected resource. Configuring PS 210 as shown by block 310 may include indicating a resource to be imitated or faked by PS 210 and configuring PS 210 as shown by block 310 may further include providing PS 210 with operational or other parameters or values to be used for imitating a resource. For example, when imitating a resource, PS 210 may send (e.g., broadcast) messages that advertise a service, the content of such messages may be according to configuration parameters or values provided by server 220. For example, values or parameters used by PS 210 such as type or range of services advertised, source and destination of messages and the like may be according to configuration data provided by server 220, to PS 210, as shown by block 310. In some embodiments, configuration of PS 210 as shown by block 310 may dictate to, or be used by, PS 210 when responding to an interaction with an attacker (e.g., when attacker 250 attacks imitated resource 230). Automation of a selection of resources to by faked may be accomplished using rules. For example, server 220 may be provided or configured with a set of rules that automate resource selection. For example, a first rule may dictate that a DNS server should not be imitated more than once a day, a second rule may dictate the no more than one LDAP service or server is to be imitated in a specific geographic location, a third rule may dictate the minimal time interval between imitating the same resource by a specific PS 210 and so on. Accordingly, by providing server 220 with a set of rules, criteria or thresholds, selection of resource to be imitated may be fully automated.

A plurality of PS 210 units may be deployed and/or configured such that together, they mimic a network. For example, to mimic or imitate a wireless sensor network (WSN) or other sensor network (e.g., a network, that includes distributed, possibly autonomous, sensors that monitor physical or other aspects or conditions, such as temperature and sound and pass measured or sensed information to a central or common entity), a set or plurality of PS 210 units may be established, deployed and configured, by serve 220 such that an entire network (e.g., a sensors network) is imitated or mimicked.

As shown by block 315, PS 210 may imitate, fake or emulate a resource. In some embodiments, PS 210 may imitate a resource. In some embodiments, PS 210 may cause a unit to imitate the resource, e.g., PS 210 may control a remote device or a software unit and cause the remote device or software unit to imitate or fake a resource. Accordingly, imitated resource 230 may be PS 210 itself, when imitating a resource as described, or imitated resource 230 may be a unit that is caused, by PS 210, to imitate a resource.

According to some embodiments and as described herein, imitating or faking a resource may include behaving like the imitated resource. For example, creating a faked resource as shown by block 315 may include sending, over network 240, messages that advertise services provided by PS 210. In other cases, or embodiments, faking a resource or asset may include opening (or listening to) ports used by a resource and responding, to communications on ports, the way a real resource does.

For example, as known in the art, in order to establish a Transmission Control Protocol (TCP) connection or session between a client and a network resource, the resource must open (and listen to) a specific, known in advance, port. Accordingly, in order to fake or imitate a resource, PS 210 may open, and listen to a port and, when a request for establishing a session on the port is received (e.g., from attacker 250), PS 210 may respond the way a real resource would, thus, attacker 250 may be fooled to think it is interacting with a real resource.

A session as referred to herein may be any communication channel or connection established between computing devices. For example, a session may be, or may include, a TCP connection opened or established between to computers as known in the art. Any other protocols or methods may be used in order to establish a session that enables at least two computers to exchange data.

Any kind or type of resource may be faked by embodiment of the invention, e.g., a server, a computerized service, an application and the like. In some embodiments, instead of, or in addition to, faking a single resource as described, a network may be faked or imitated. For example, one or more PS 210 may fake or imitate a network by using (e.g., for interactions with attacker 250) a specific network protocol. In some embodiments, PS 210 may imitate a network by imitating or faking elements such as: a device in the faked network; a server in the faked network; a computerized service in the faked network and an application in the faked network. Accordingly, by using a specific network protocol and faking devices, assets or resources in a network, embodiments of the invention may imitate a network and may cause an attacker interacting with the faked network to think or believe (and therefore behave as if) it is interacting with a real network. For example, a network of a hospital or other medical institution may be faked or imitated by a PS 210 unit that may broadcast, on a network, that it provides services typically provided by serves of a hospital, e.g., a PS 210 may advertise providing patient registration, medical results and the like, possibly using protocols used by known medical applications. It will be understood that, just as protocols of various applications and networks may be known to attackers they may be known to server 220, accordingly, any network or resource that may be known to and/or identified by an attacker may be known to server 220 that may, using such knowledge, configure a PS 210 unit to imitate the network or resource as described.

In some embodiments, PS 210 may be to imitate a resource, as shown by block 315, according to predefined rules. For example, in addition to, or instead of, configuration data provided to PS 210 by server 220 as shown by block 310, PS 210 include pre-configured parameters, values or other data and PS 210 may use pre-configured parameters or values when imitating a resource. For example, a maximal time for imitating a resource may be pre-configured and PS 210 may terminate an imitation of a resource when the maximal time expires or ends. A PS 210 may, autonomously, e.g., regardless of, or without receiving, instructions from server 220, terminate an imitation of a resource and, possibly, select to imitate another resource. For example, If PS 210 receives more than a preconfigured number of attacks from the same source (or of the same type) and PS 210 has already collected at least a predefined set of parameters related to the attacks, e.g., the IP address of the attacker, port used and protocol used, then PS 210 may, automatically and autonomously, terminate an imitation of a resource. For example, terminating an imitation of a resource as described may be done in order to protect the true identity of a PS 210 such that attackers do not readily identify the PS 210. For example, since a PS 210 may imitate resources without actually providing services, some attackers may realize, given enough time, that the resources is an imitated one, accordingly, by terminating an imitation of a resource after a short time period or once enough data related to an attacker is collected, a PS 210 may continuously fool attackers to think it is a real, genuine resource.

As shown by block 320, imitated resource 230 may interact with attacker 250. For example, attacker 250 may establish a network session with imitated resource 230 over a network port to which PS 210 listens as described, and attacker 250 may then use the session to request a service from imitated resource 230. As described, based on an interaction of an attacker with an imitated resource (or with PS 210), PS 210 may determine that an attack is under way or in progress.

As shown by block 325, imitated resource 230 and/or PS 210 may collect and generate data related to an attacker and/or an attack. For example, thinking imitated resource 230 is a real resource, attacker 250 may attack, or attempt to attack, imitated resource 230, e.g., using techniques or methods as described herein or as known in the art. Any information or data related to attacker 250 and/or an attack launched by attacker 250, on imitated resource 230, may be collected as shown by block 325. For example, the IP address of attacker 250, any data or information related to, or included in, messages received from attacker 250 may be collected and/or stored by PS 210. Data generated as shown by block 325 may include time related aspects (e.g., time and duration or length of attack, size and frequency of messages and the like). Generally, any relevant computer forensics data or information may be collected and stored by PS 210 as shown by block 325. Forensic data may include files which might contain malware and sent during the attacks, such files or malware may be collected or obtained, by PS 210 and may be sent to server 220 for further analysis and investigation.

As shown by block 330, PS 210 may provide server 220 with data related to an attack. Any information or data obtained, collected and/or generated by PS 210 and/or imitated resource as described herein may be provided to server 220 as shown by block 330. For example, information sent to server 220 as shown by block 330 may include an identification of attacker 250 (e.g., an IP address, a location or computer name), identification of an attack (e.g., techniques used, specific resources attacked and the like), data related to a session established between attacker 250 and imitated resource 230 and so on.

As shown by block 335, an attack may be identified and data related to the attack may be stored and/or presented or provided to a user or to an application. Identifying an attack may include determining that an attack, on an imitated resource, was launched, is in progress, or is currently under way. For example, any data related to an attack, e.g., an identification value or parameter, or metadata such as time of an attack, may be stored in storage system 225.

Data related to an attack in storage system 225 may be used in various ways. For example, an attack may be identified based on data in storage system 225, e.g., by comparing data related to the attack to data of a previous attack. For example, using data in storage system 225, server 220 may identify some or all attacks of a specific attacker or hacker over a time period, in a specific geographic location etc.

Data related to an attack in storage system 225 may be used in order to present information to a user or provide information to applications. For example, using data in storage system 225, server 220 may identify an increase in the number of attacks of a specific type, in a specific region (e.g., identify an increase in the number of DOS attacks in Asia) and server 220 may accordingly configure PS 210 units located in Asia such that they are best configured to lure an attacker to attack them, e.g., by listening to a port used by the identified DOS attacks. Various other computer applications may be provided with, and may use, data in storage system 225, e.g., Firewalls in a specific region or time may be configured based on identified attacks or attackers, statistics, and the like.

Server 220 may use data in storage system 225 in order to present, to a user, numerical, graphical or any other information, e.g., on a monitor or screen connected to server 220. For example, data related to a specific attack may be presented or statistical data related to attacks over time and/or a geographical region may be presented, e.g., in lists, tables or graphs.

Server 220 or PS 210 may detect an attack (or determine an attack was launched or started) based on an interaction of an attacker with an imitated resource. In some embodiments, based on an attempt to receive a service from an imitated or faked resource, an attack may be detected. For example, it may be expected that non-malicious entities would not attempt to receive services from imitated or faked resources but hackers (who may use crawlers or bots as known in the art) may do so, accordingly, any attempt to receive a service from an imitated resource may be suspected and may be used in order to identify an attack. If PS 210 determines that an entity attempting to receive a service is a non-malicious entity (e.g., the IP address is in a white list of legitimate entities) then PS 210 may refuse to provide the service. Other methods of detecting an attack may be used.

In some embodiments, an attack may be identified, characterized, classified or categorized based on a port used by attacker 250 in order to establish a connection with PS 210, based on attributes, parameter or other session data related to a session established between an attacker (e.g., attacker 250) and an imitated resource (e.g., imitated resource 230).

In some embodiments, describing or categorizing an attack may include at least one of: identifying an application used by an attacker, identifying a method used for the attack and identifying a bot participating in the attack. For example, an application used by an attacker may be a web browser or bot, a method may be or may include specific message sequences sent during an attack and the like.

As known in the art, a bot (short for "robot") is an automated program or application for examples, web crawlers, chat room bots, and malicious bots. As known in the art, a botnet is a number of computers or bots, connected to a network such as the internet, and controlled such that they coordinate their actions which are typically malicious, e.g., launch DOS or DDoS attacks. Server 220 may use data collected as described in order to identify a bot or botnet used for, or participating in, an attack. For example, it may be known that a specific bot or botnet uses a specific protocol, technique or application and, if the protocol, technique or application are identified or determined, by server 220, then server 220 may identify or conclude that the bot or botnet participated in, or were used for, an attack and an indication of the bot or botnet may be included in a categorization of the attack. As described, categorizing information may be presented to a user, for example, server 220 may present or show, on a monitor connected to server 220, any categorizing information described herein such that a user may receive a comprehensive report of or on an attack. Accordingly, a report presented to a user may include categorizing information for an attack.

As shown by block 340, PS 210 may be instructed, by server 220, to terminate an imitation of a resource. As shown by block 345, in some embodiments, PS 210 may terminate an imitation of a resource upon receiving a command from server 220. For example, configuration data (e.g., stored in storage system 225) for a specific resource may also include a duration and server 220 may command PS 210 to terminate an imitation of the resource based on the duration.

In some embodiments, PS 210 may be adapted to, based on a command received from server 220, do one of: autonomously terminate an imitation of a resource or terminate the imitation of the resource in response to, or when receiving a, message from server 220. For example, a command or configuration received from server 220 may instruct PS 210 to terminate an imitation of a resource when one or more conditions are met and PS 210 may autonomously terminate an imitation of a resource upon determining the condition have been met. For example, a command or configuration may indicate that an imitation of a resource is to be terminated if no interaction from an attacker is detected for more than couple of days or other configured time period. In such case, PS 210 may terminate an imitation of imitated resource 230 if, during the time period, no attempt to interact with imitated resource is detected or identified. Any other configuration parameters or values may be used by PS 210 in order to autonomously terminate an imitation of a resource. PS 210 may inform server 220 that an imitation of a resource has been terminated, e.g., using a message as known in the art. PS 210 may include any data in a message indicating to server 220 of a termination of an imitation of a resource, for example, the reason why an imitation was terminated, e.g., a time threshold reached, a maximum number of interactions reached etc.). Other predefined parameters (e.g., other than a time period for imitating a resource and a number of interactions with an imitated resource as described) may be used and reported in a message informing server 220 of a termination of an imitation of a resource. For example, based on an identity of an attacker that interacts or interacted with the imitated resource 230, PS 210 may terminate the imitation of resource 230. For example, a configuration received from server 220 may cause PS 210 to terminate an imitation of resource 230 twenty (20) seconds after an interaction of imitated resource 230 with a first attacker is detected, terminate an imitation of resource 230 sixty (60) seconds after an interaction with a second attacker is detected and allow an interaction to go on as long as the attacker is active or communicating with imitated resource 230 if the attacker is a third, known attacker. For example, if it is known that the first attacker is capable of, relatively quickly, determine that it is interacting with a faked resource, then terminating an imitation quickly as described may help in disguising imitated resource 230.

In some cases, communication between PS 210 and server 220 may be down or lost. If PS 210 identifies or determines that communication with server 220 is unavailable, PS 210 may record data related to an attack, modify a network configuration of at least one of its network interfaces and attempt to communicate with server 220 using the network interface for which configuration was modified. In some embodiments, if PS 210 identifies communication with server 220 is unavailable, PS 210 may store data related to an attack on a predefined storage system, e.g., a preconfigured network storage system or unit as known in the art.

Figure 4:
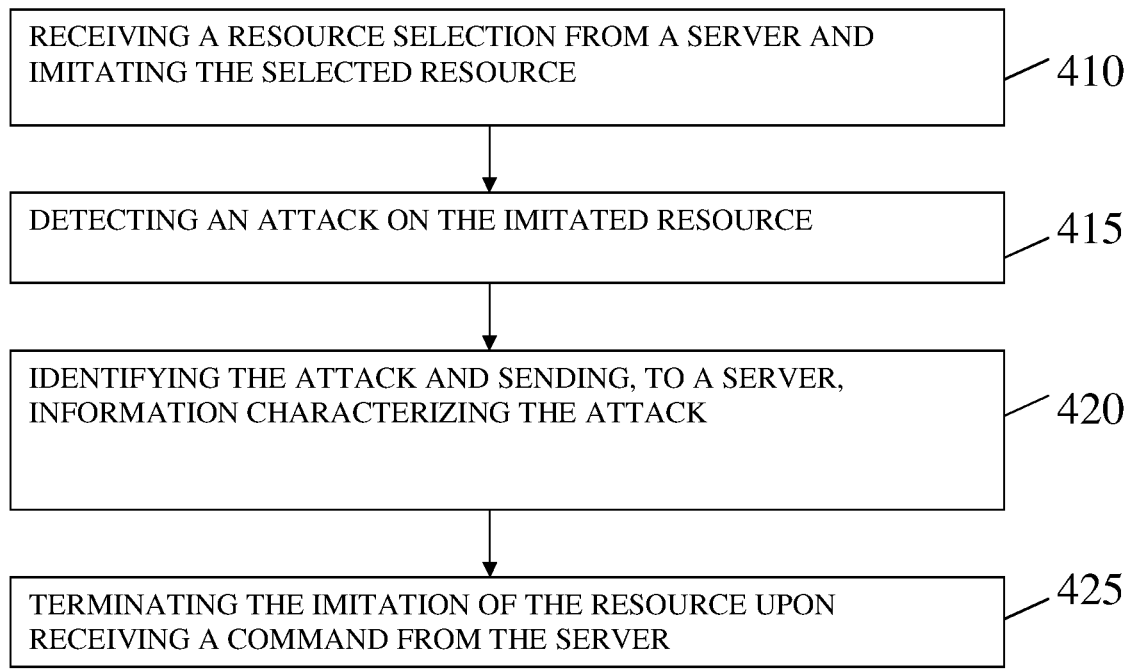
FIG. 4 shows a flowchart of a method according to illustrative embodiments of the present invention.

Reference is made to FIG. 4, a flowchart of a method according to illustrative embodiments of the present invention. As shown by block 410, a resource selection may be received and the selected resource may be imitated. For example, PS 210 may receive a selection of a resource from server 220 and may imitate the selected resource, e.g., as shown by imitated resource 230.

As shown by block 415, an attack on an imitated resource may be detected. For example, PS 210 may detect an attack on imitated resource 230 as described. As shown by block 420, the attack may be identified and information characterizing the attack may be sent to a server. For example, PS 210 may identify and/or characterize an attack and may send to server 220 information characterizing the attack. As shown by block 425, upon receiving a command from the server, an imitation of the resource may be terminated. For example, PS 210 may terminate an imitation or faking of a resource upon receiving a command from server 220 as described.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A system for identifying cyber-attackers comprising:
   (1) a plurality of polymorphic sensors, located in respective geographic locations, the polymorphic sensors each including at least one controller and associated memory, the memory including executable code that when executed cause each polymorphic sensor to perform:
      repeatedly receiving and instructions from a central server including instructions to imitate resources advertising one or more services on a network, wherein imitating resources further comprises providing known Transmission Control Protocol (TCP) port addresses for the respective imitated services, opening connections, at the TCP port provided, and providing over the opened connections one or more responses of the imitated services, and
      characterizing an attack on the polymorphic sensor imitating a resource, according to a protocol used for the attack, an amount of data transferred during the attack, a speed used for the attack, and a port used to establish a connection; and
   (2) the central server, including at least one controller and associated memory, the memory including executable code that when executed cause the central server to perform:
      receiving, from the polymorphic sensors, reports characterizing attacks in a specific geographic location, and responsively identifying an attacker according to the characterization;
      issuing instructions to a first polymorphic sensor in the geographic location to begin imitating a new resource; and
      issuing to a second polymorphic sensor an instruction to terminate imitation of a resource, wherein timing of the termination is dependent on the identity of the attacker, and wherein the termination is implemented to prevent the attacker from determining that the resource is being imitated by the second polymorphic sensor.

2. The system of claim 1, wherein the attack is a denial-of-service (DOS) attack.

3. The system of claim 1, wherein the central server is further configured to convey to firewalls in the geographic region statistics for firewall configuration according to the identity of the attacker.

4. The system of claim 1, wherein an imitated service is any service from a list of network services that includes at least one of a domain name server (DNS), a lightweight directory access protocol (LDAP) server, and a simple mail transfer protocol (SMTP) server.

5. The system of claim 1, wherein the instructions from the central server further include information identifying other polymorphic sensors.

6. The system of claim 1, wherein the characterization further includes identifying an application used by an attacker, identifying a method used for the attack and identifying a bot participating in the attack.

7. The system of claim 1, wherein identifying the attacker comprises recognizing from the reports characterizing attacks that the attacker is a previously known attacker.

8. The system of claim 1, wherein the central server is further configured to select the first polymorphic sensor to begin imitation of a resource according to a load balancing algorithm based on a calculation of available polymorphic sensors in a network.

9. The system of claim 1, wherein each polymorphic sensor is further adapted to autonomously terminate imitation of a resource based on at least one predetermined parameter and to report the termination to the central server, wherein the predefined parameter is related to at least one of: a time period for imitating a resource, a number of interactions with an imitated resource and an identity of an attacker interacting with the resource.

10. The system of claim 1, wherein each polymorphic sensor is further adapted to: determine that communication with the central server is unavailable; record data related to the attack; modify a network configuration of at least one network interface of the polymorphic sensor; and attempt to communicate with the server using the network interface.

11. A method for identifying cyber-attackers comprising:
   (1) at each of a plurality of polymorphic sensors, located in respective geographic locations, the polymorphic sensors each including at least one controller and associated memory including executable code,
      repeatedly receiving and implementing instructions from a central server including instructions to imitate resources advertising one or more services on a network, wherein imitating resources further comprises providing known Transmission Control Protocol (TCP) port addresses for the respective imitated services, opening connections, at the TCP port provided, and providing over the opened connections one or more responses of the imitated services, and
      characterizing an attack on the polymorphic sensor imitating a resource, according to a protocol used for the attack, an amount of data transferred during the attack, a speed used for the attack, and a port used to establish a connection, and reporting the characterization to the central server; and
   (2) at the central server, the central server including at least one controller and associated memory including executable code:
      receiving, from the polymorphic sensors, reports characterizing attacks in a specific geographic location, and responsively identifying an attacker according to the characterization;
      issuing instructions to a first polymorphic sensor in the geographic location to begin imitating a new resource; and
      issuing to a second polymorphic sensor an instruction to terminate imitation of a resource, wherein timing of the termination is dependent on the identity of the attacker, and wherein the termination is implemented to prevent the attacker from determining that the resource is being imitated by the second polymorphic sensor.

12. The method of claim 11, wherein the attack is a denial-of-service (DOS) attack.

13. The method of claim 11, wherein the central server is further configured to convey, to firewalls in the geographic region statistics for firewall configuration, according to the identity of the attacker.

14. The method of claim 11, wherein an imitated service is any service from a list of network services that includes at least one of a domain name server (DNS), a lightweight directory access protocol (LDAP) server, and a simple mail transfer protocol (SMTP) server.

15. The method of claim 11, wherein the instructions from the central server further include information identifying other polymorphic sensors.

16. The method of claim 11, wherein the characterization further includes identifying an application used by an attacker, identifying a method used for the attack and identifying a bot participating in the attack.

17. The method of claim 11, wherein identifying the attacker comprises recognizing from the reports characterizing attacks that the attacker is a previously known attacker.

18. The method of claim 11, further comprising, at the central server, selecting the first polymorphic sensor to begin imitation of a resource according to a load balancing algorithm based on a calculation of available polymorphic sensors in a network (49).

19. The method of claim 11, further comprising, at each polymorphic sensor, autonomously terminating imitation of a resource based on at least one predetermined parameter and reporting the termination to the central server, wherein the predefined parameter is related to at least one of: a time period for imitating a resource, a number of interactions with an imitated resource and an identity of an attacker interacting with the resource.

20. The method of claim 11, further comprising, at each polymorphic sensor, determining that communication with the central server is unavailable; recording data related to the attack; modifying a network configuration of at least one network interface of the polymorphic sensor; and attempting to communicate with the server using the network interface.

\* \* \* \* \*